E. R. PELLING AND V. A. MATTICK.
MOTOR TRACTOR PLOW.
APPLICATION FILED NOV. 22, 1920.

1,403,101.

Patented Jan. 10, 1922.
2 SHEETS—SHEET 1.

INVENTORS
Ernest R. Pelling & Victor A. Mattick.

per Robert S. Phillips.
Attorney

UNITED STATES PATENT OFFICE.

ERNEST RICHARD PELLING, OF CROYDON, AND VICTOR ALEXANDER MATTICK, OF BECKENHAM, ENGLAND.

MOTOR TRACTOR PLOW.

1,403,101.   Specification of Letters Patent.   Patented Jan. 10, 1922.

Application filed November 22, 1920. Serial No. 425,868.

*To all whom it may concern:*

Be it known that we, ERNEST RICHARD PELLING, a subject of the King of Great Britain and Ireland, residing at the Engineer's House, Selsdon Park, Croydon, in the county of Surrey, England, and VICTOR ALEXANDER MATTICK, a subject of the King of Great Britain and Ireland, residing at 83 St. James Avenue, Beckenham, in the county of Kent, England, have invented a new and useful Improvement in Motor Tractor Plows, (for which we have filed application in Great Britain Nov. 12, 1919, No. 28,074, accepted under No. 158,712,) of which the following is a full and complete specification.

This invention relates to tractor plows of the self-contained anti-balance type, and it has for its object to cause the frame carrying the two groups or gangs of plow shares to tip automatically and instantaneously on reversal of the direction of motion of the tractor. Another object of the invention is to prevent the idle gang of plow shares acting as a counter-balance to the gang of plow shares at work which tends to lift the latter and so make the furrows of unequal depth. A further object is to enable the gang of plow shares which is being brought into contact with the ground after the frame of the plow has been automatically tipped to be forced into contact therewith by the driver until they have obtained a grip therein whereby the services of a second man can be dispensed with, and a still further object is to balance the lateral strain of the traction of the plow whereby the steering is materially facilitated.

We attain these ends by coupling the frame carrying the two gangs of plow shares to the tractor in the manner usual in anti-balance one-way plows so that a small amount of relative movement can take place between said frame and said tractor, by the employment of flexible draught tackle between each end of the frame of the plow and the frame of the tractor, by connecting each end to the frame of the plow with lifting tackle which is automatically brought into operation by relative longitudinal movement between the tractor and the plow, and by the employment of means whereby extra pressure can be exerted on the end of the frame of the plow carrying the gang of shares for the time being in engagement with the land.

In the accompanying drawings which illustrate this invention:—

Throughout the view similar parts are marked with like letters of reference.

Figure 1:
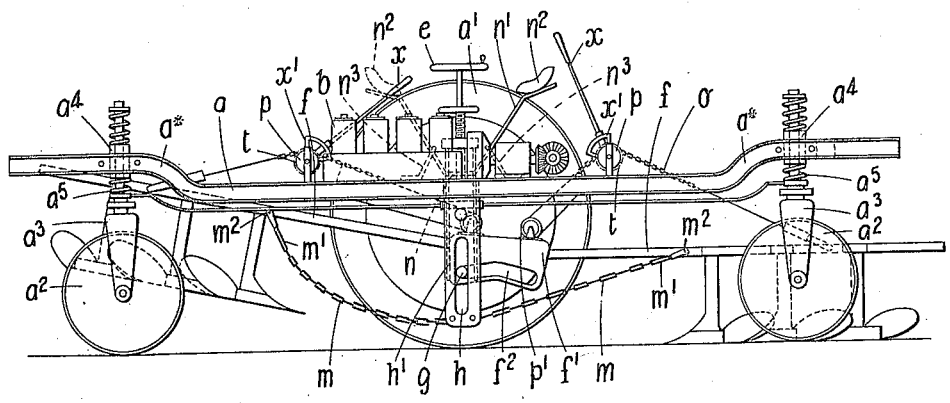
Fig. 1 is a view in side elevation of the complete implement.

The type of tractor plow to which this invention relates consists of two essential elements, a tractor and a plow. The former comprises a frame $a$ hereinafter called the "tractor frame"—which carries the power unit $b$, the clutch $d$, the gear box $d'$ and the reversing gear $c$, $c'$ and $d^2$, $d^3$ and is carried by two driving road wheels $a'$, $a'$ and two steering wheels $a^2$, $a^2$ which latter are both located on one side of the tractor frame fore and aft of one of the driving wheels said steering wheels being carried by forks $a^3$ which are telescopically mounted in heads or sockets $a^4$ carried by fore and aft extensions $a^*$ of the frame $a$ with cushioning springs $a^5$ interposed between said fork and said head or socket to allow each steering wheel a limited amount of independent movement and said extensions being braced to the frame $a$ by stay bars $a^{**}$. It also comprises mechanism for controlling the steering wheels $a^2$, $a^2$ which consists of a hand wheel $e$ of the usual type mounted at or about the centre of the frame $a$ and in couple with said steering wheels by mechanism such as a cross shaft $e'$, a coupling rod $e^2$ connecting the two arms $a^6$ $a^6$ carried by the forks $a^3$, $a^3$, a spur pinion $e^3$ on the shaft $e'$ and a rack $e^4$ in or on the rod $e^2$ with which the pinion $e^3$ gears. It further comprises means for reversing the position of the driver's seat comprising a collar $n$ mounted on the pillar carrying the steering control wheel $e$ which is free to rotate with respect to said pillar, an upwardly projecting arm $n'$ hinged to said collar by means of a horizontally disposed pivot and a seat $n^2$ for the driver carried by said arm, and two forks $n^3$ $n^3$ mounted on the platform of the frame $a$ fore and aft of the collar $n$ with which the arm $n'$, carrying the seat engages to bring the seat $n^2$ into position either fore or aft of the pillar carrying the steering control wheel $e$ according to the direction in which the tractor is to be driven.

Midway in the length of the frame $f$ of the plow are blocks $f'$ each of which is carried by one of the longitudinal members of said frame. In each of these blocks is a longitudinal slot $f^2$ of inverted V-shape. Through these slots passes a bar $g$ which is mounted in bearings free to slide in slots $h$ in depending brackets $h'$ carried by the frame $a$ said bar being provided with the usual screw lifting and lowering gear as shown.

Each end of the frame of the plow is coupled with the brackets $h'$ or any other convenient parts of the frame $a$ by two pairs of draught chains $m, m$ each pair of which is connected to the frame $f$ of the plow at a single point $m^2$ through a whipple tree $m'$ the lengths of said coupling chains being such as will allow of the desired amount of relative movement taking place between the frame of the plow and the frame of the tractor within the limit of the slots $f^2$.

Attached to each end of the frame $f$ of the plow is a chain $o$ which after passing over a sprocket wheel $p$ carried by a bracket $t$ mounted on the frame $a$ of the tractor at a suitable distance from the vertical plane of the axis of the driving wheels $a'$ passes round a plain pulley $p'$ mounted on one of the blocks $f'$ or on any other suitable part of the frame $f$ of the plow at or about the centre of its length and then runs fore or aft and is anchored to the frame $a$ of the tractor at any suitable position fore or aft of the axis of its driving wheels so that it operates on the pulley block system. The effect of this coupling is that the relative longitudinal movement which takes place between the tractor and the plow when reversing at the headlands operates to lift one end of the frame of the plow and consequently to lower the other end thereof and thus bring one plow out of its plowing position and the other plow into its plowing position.

Figure 2:
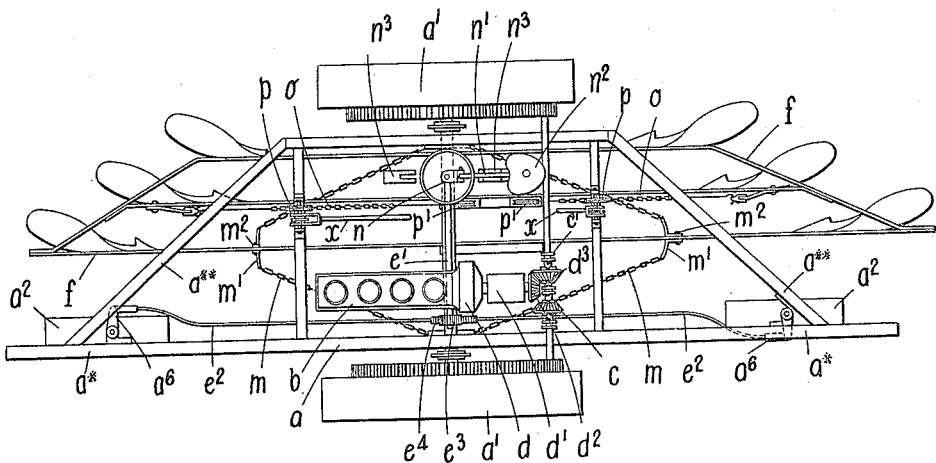
Fig. 2 is a view in plan thereof.

In order to increase the effective weight on the gang of plow shares in contact with the ground for the purpose of causing the shares to get grip of the land the sprocket wheels $p$ are each provided with means for rotating same for the purpose of increasing the tension of the chain connected to the end of the frame of the plow which is for the time being lifted whereby an increased pressure is exerted on the other end of said frame. A convenient hand operated mechanism for rotating the sprocket wheels consists of a pair of hand levers $x$ which are pivoted about the axes of said wheels as shown in Figs. 1 and 2 and are provided with means whereby they can be coupled to or uncoupled from said wheels. Quadrants $x'$ or other equivalent devices may be employed to retain the levers $x$ in suitable positions for manipulation.

Figure 3:
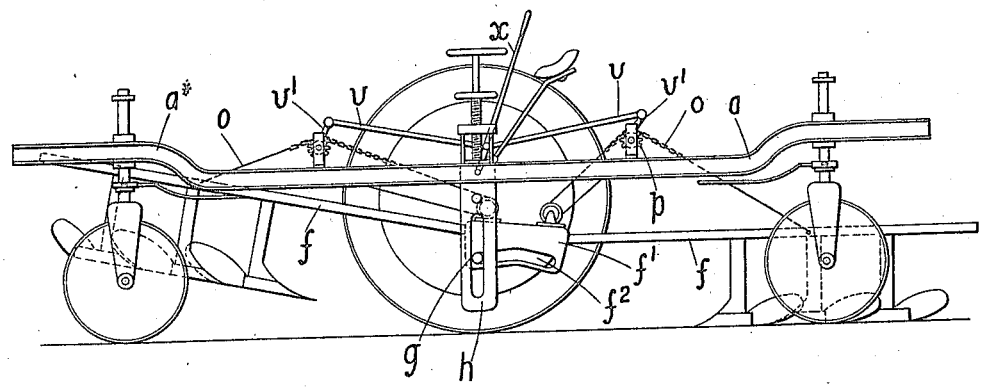

Instead of employing a hand lever for operating each of the sprocket wheels $p$ independently a single hand lever $x$ may be employed as shown in Fig. 3 said lever being pivoted to the frame of the tractor and coupled by means of links $v$ to arms or levers $v'$ $v'$ pivoted co-axially with the sprocket wheels $p$ and coupled thereto by clutches as aforesaid.

Figure 4:
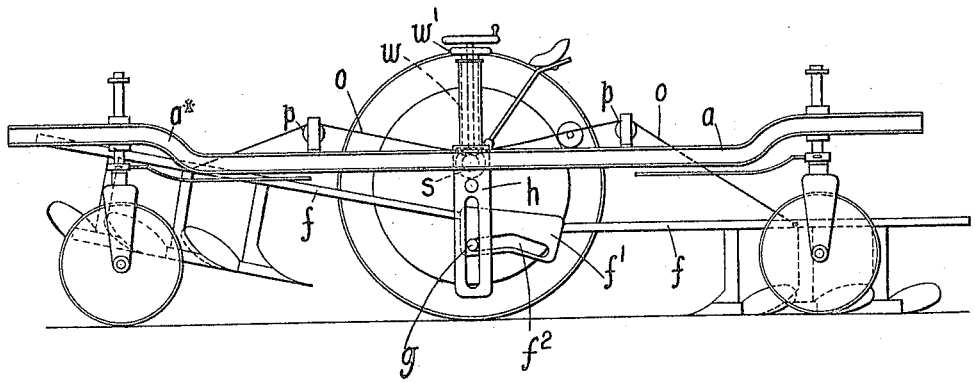
Figs. 3 and 4 are views in side elevation showing modifications of the mechanism for applying the increased pressure on either end of the frame of the plow.

Instead of using a hand operating lever a winding drum $s$ may be employed in which case the two chains $o$ run over plain pulleys $p$ mounted in bearings carried by the frame of the tractor and direct to said drum on which they are wound in opposite directions, said drum being provided with mechanism for rotating it by hand as shown in Fig. 4. A suitable mechanism for this purpose consists of a shaft $w$ geared to the drum either directly or indirectly by bevel gearing said shaft being provided at its upper end with a wheel $w'$ for imparting motion to it.

We claim—

1. In combination a motor tractor; a one-way plow of the anti-balance type; connecting means between said tractor and said plow which comprises longitudinally arranged slots in the frame of the plow, a transverse bar carried by the frame of the tractor and engaging said slots and flexible couplings between said tractor and said plow; and gearing of the pulley block type between the frame of the tractor and the frame of the plow so that when the direction of motion of the tractor is reversed the frame of the plow will be automatically tipped.

2. The combination of a motor tractor, a one-way plow of the anti-balance type, a coupling between the frame of said tractor and the frame of said plow which allows a limited amount of relative longitudinal movement to take place between said frames when the direction of motion of the tractor is reversed, mechanism adapted to automatically operate between the frame of the tractor and the frame of the plow when the direction of motion of the tractor is reversed, to tip the frame of the plow and means for increasing the effective weight on either end of the frame of the plow.

3. The combination of a motor tractor, a one-way plow of the anti-balance type, flexible draught tackle between said tractor and said plow, a coupling between the frame of said tractor and the frame of said plow which allows a limited amount of relative longitudinal movement to take place between said frames when the direction of motion of the tractor is reversed, pulley and block gear operating between the frame of the tractor and the frame of the plow whereby said relative movement between said two elements causes the frame of the plow to tip automatically so as to bring the one gang of plows clear of the land and the other gang of plows into contact with same, and means for increasing the effective weight on either end of the frame of the plow.

4. In combination a wheeled frame, an anti-balance one-way plow, a coupling between the wheeled frame and the plow frame which will permit a limited amount of relative movement to take place between said frames; two sets of draught tackle between said frames which will allow of said relative movement, each set being connected to the frame of the plow by a whipple tree, and mechanism for automatically tipping the frame of the plow when relative movement takes place between the wheeled frame and the plow frame.

5. In combination, a wheeled frame, an anti-balance one-way plow, a coupling between said wheeled frame and the plow frame which will permit a limited amount of relative movement to take place between said frames, two sets of draught tackle between said frames the attachment of each set to the plow frame being through a whipple tree, and pulley block gear operating between the wheeled frame and the plow frame whereby relative movement between said two elements automatically operates to tip the frame of the plow, and means for exerting and increasing the effective weight on either end of the plow frame.

6. The combination of a wheeled frame, an anti-balance one-way plow; a coupling between the wheeled frame and the plow frame which will allow a limited amount of relative movement to take place between said frames; two sets of draught tackle between said elements which will allow of said relative movement; and an automatic tipping gear comprising two chains each connected to one end of the plow frame and each of which runs first over a sprocket wheel carried by the wheeled frame at a suitable distance from the axis of its wheels, then round a pulley carried by the frame of the plow at or about the centre of its length and then forward again its free end being attached to the wheeled frame at a suitable distance from the axis of its wheels, and means for increasing the tension on either of the chains of said tipping gear.

ERNEST RICHARD PELLING.
VICTOR ALEXANDER MATTICK.